United States Patent
Lin

[11] Patent Number: 6,138,411
[45] Date of Patent: Oct. 31, 2000

[54] PLANT CONTAINER WITH RESERVOIR AND NESTED POTS

[76] Inventor: Li-Chieh Lin, 58 Ma Yuan W. St., Taichung, Taiwan

[21] Appl. No.: 09/344,233

[22] Filed: Jun. 25, 1999

[51] Int. Cl.[7] .................................................. A01G 27/00
[52] U.S. Cl. ............................................. 47/79; 47/65.5
[58] Field of Search ................. 47/79, 80, 65.5, 47/66.1, 48.5

[56] References Cited

U.S. PATENT DOCUMENTS

| | | | |
|---|---|---|---|
| 2,738,621 | 3/1956 | Abbrecht | 47/97 |
| 3,137,096 | 6/1964 | Hopkins | 47/79 |
| 3,769,748 | 11/1973 | Goldring | 47/48.5 |
| 3,804,331 | 4/1974 | Levey | 47/48.5 X |
| 4,885,869 | 12/1989 | Kim | 47/79 X |
| 4,961,285 | 10/1990 | Jenkins et al. | 47/79 |
| 5,239,774 | 8/1993 | Rickabaugh | 47/66.1 |
| 5,491,928 | 2/1996 | Potochnik | 47/79 |
| 5,509,232 | 4/1996 | Laubsch | 47/79 |

FOREIGN PATENT DOCUMENTS

| | | | |
|---|---|---|---|
| 3317785 A1 | 11/1984 | Germany | 47/80 |
| 2249247 | 5/1992 | United Kingdom | 47/79 |

*Primary Examiner*—Michael J. Carone
*Assistant Examiner*—Jeffrey L. Gellner

[57] ABSTRACT

A flowerpot device has a base seat, an outer pot disposed on the base seat, an inner pot disposed in the outer pot, an annular sponge disposed in the inner pot, a collar disposed on the annular sponge, an annular water container disposed on the collar, and a hollow decoration casing enclosing the outer pot. The base seat has an annular threaded center portion, air-permeable web holes, a threaded hole, drain apertures, and a first alarm device. The inner pot has reinforced ribs and drain holes. The annular water container has an annular interior, a water inlet hole, through apertures, and a second alarm device.

1 Claim, 4 Drawing Sheets

PLANT CONTAINER WITH RESERVOIR AND NESTED POTS

BACKGROUND OF THE INVENTION

The present invention relates to a flowerpot device. More particularly, the present invention relates to a flowerpot device which can control a water volume.

A conventional flowerpot has a pot and a separation disk disposed in the pot. However, the conventional flowerpot cannot control a water volume nor water a potted plant continuously. If water is poured into the conventional flowerpot too much, the roots of the potted plant will be putrid.

SUMMARY OF THE INVENTION

An object of the present invention is to provide a flowerpot device which can control a water volume.

Another object of the present invention is to provide a flowerpot device which can provide an air-permeable environment for a potted plant.

Accordingly, a flowerpot device comprises a base seat, an outer pot disposed on the base seat, an inner pot disposed in the outer pot, an annular sponge disposed in the inner pot, a collar disposed on the annular sponge, an annular water container disposed on the collar, and a hollow decoration casing enclosing the outer pot. The base seat has an annular threaded center portion, a plurality of air-permeable web holes, a threaded hole, and a plurality of drain apertures. The outer pot has an annular threaded bottom portion. The annular threaded bottom portion engages with the annular threaded center portion. The inner pot has a plurality of reinforced ribs, and a plurality of drain holes communicating with the drain apertures of the base seat. A plurality of air-permeable reverse cone-shaped holes are formed on each of the reinforced ribs. The annular sponge has a plurality of periphery grooves. Each of the reinforced ribs is inserted in the respective periphery groove. The annular water container has an annular interior, a water inlet hole formed on a top portion of the annular water container to communicate with the annular interior, and a plurality of through apertures formed on a bottom of the annular water container to communicate with the annular interior. A drain tube engages with the threaded hole of the base seat.

DETAILED DESCRIPTION OF THE INVENTION

Figure 1:
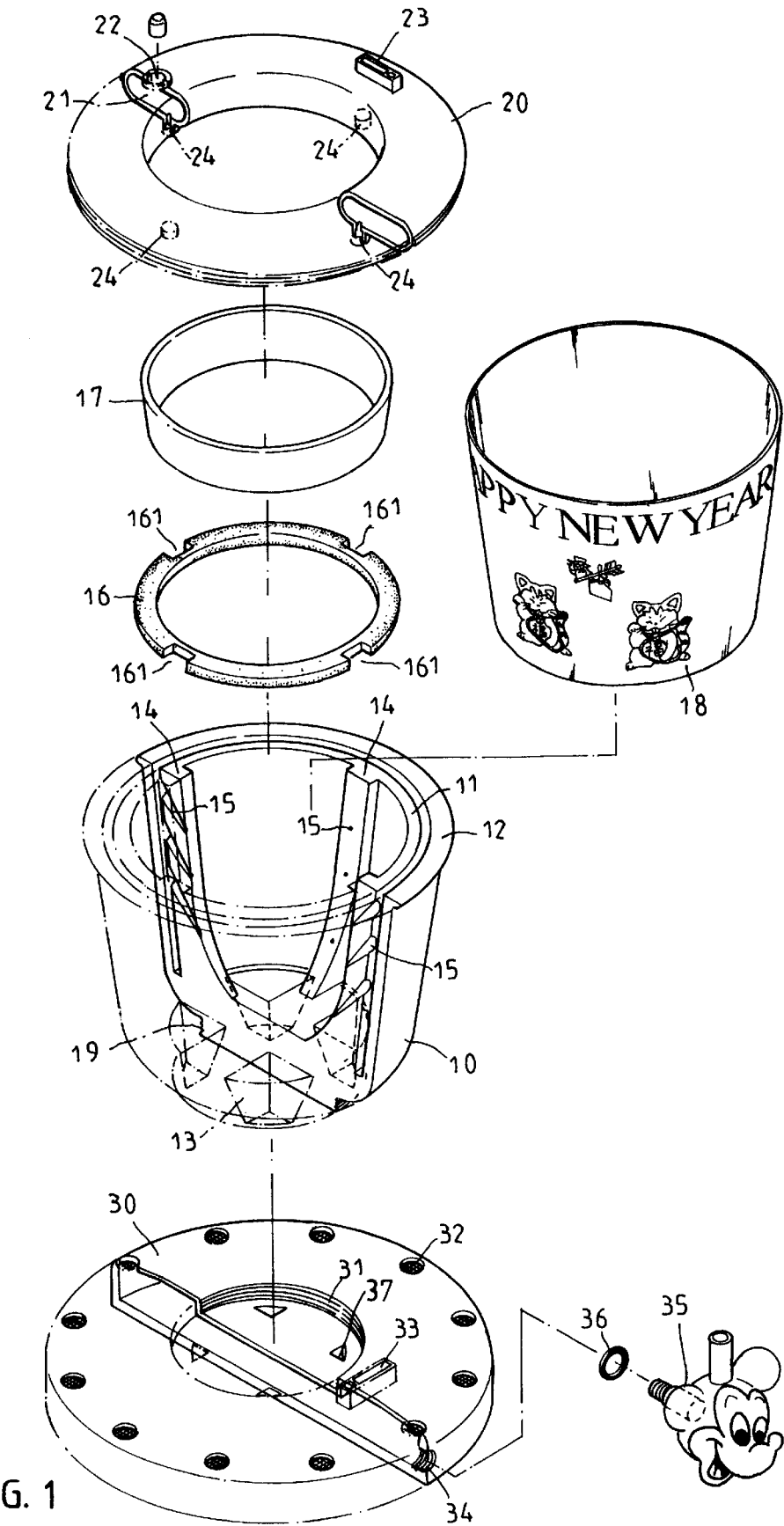
FIG. 1 is a perspective exploded view of a flowerpot device of a preferred embodiment.
Figure 2:
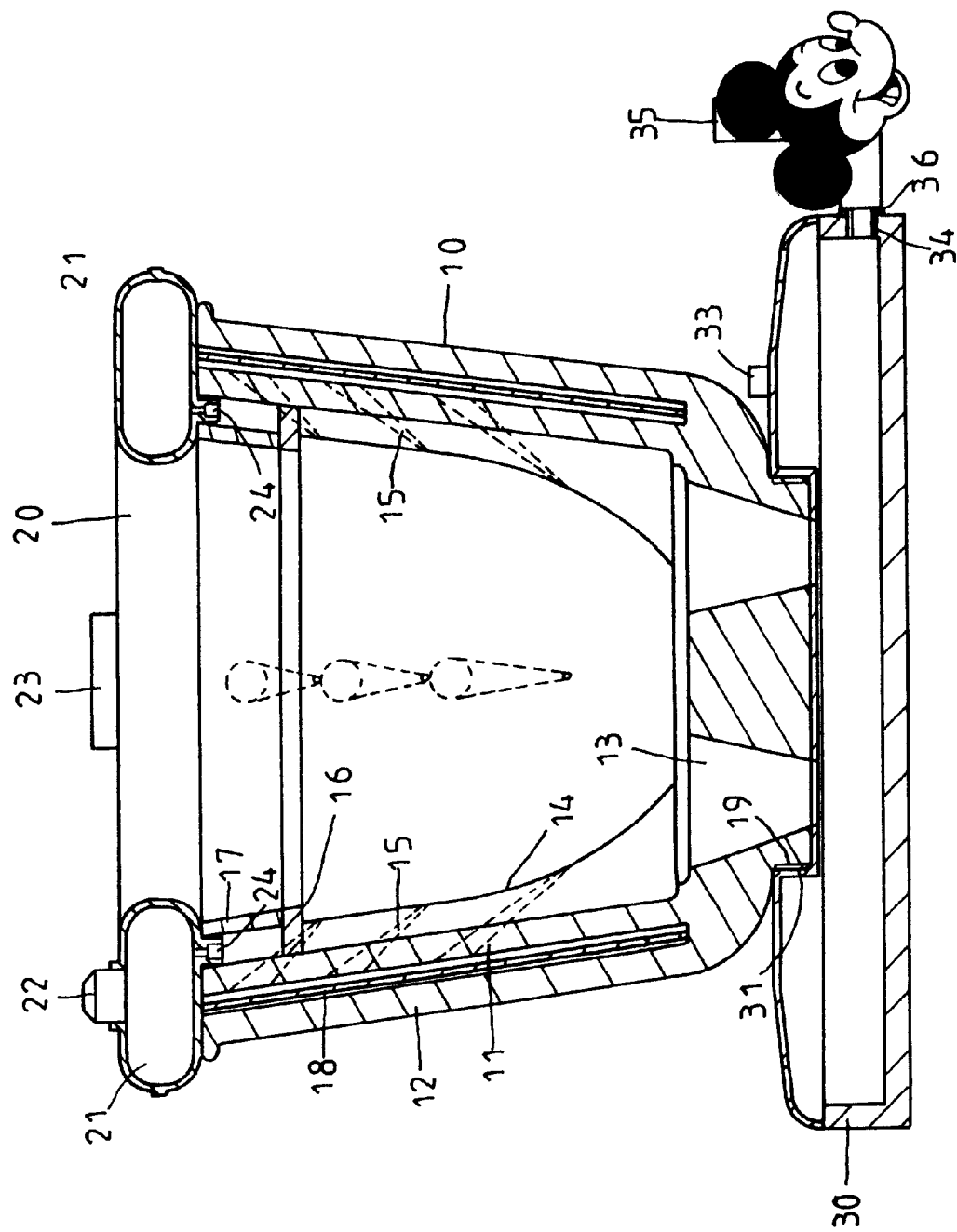
FIG. 2 is a sectional assembly view of a flowerpot device of a preferred embodiment.
Figure 3:
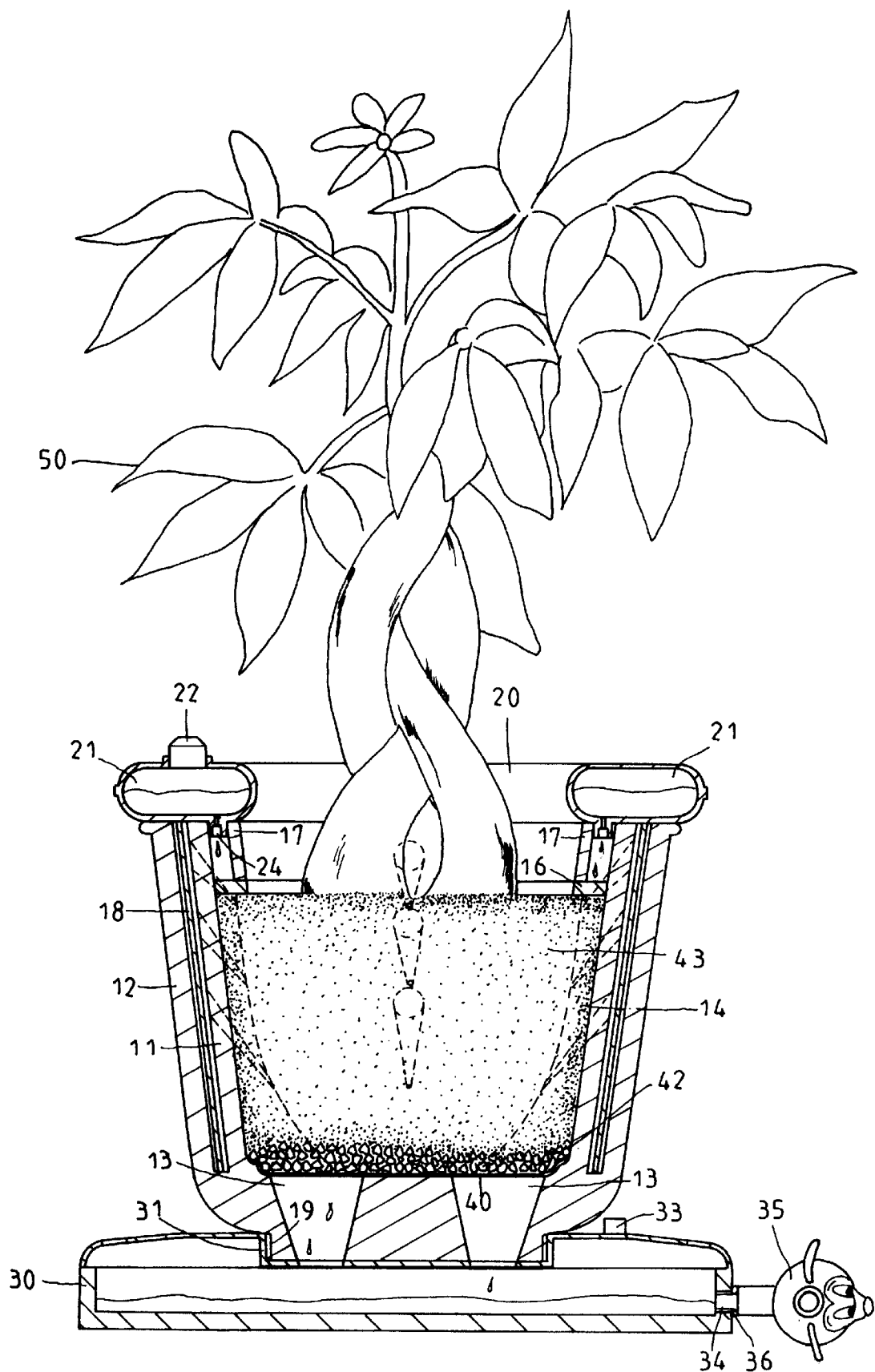
FIG. 3 is a schematic view illustrating a potted plant planted in a flowerpot device of a preferred embodiment.
Figure 4:
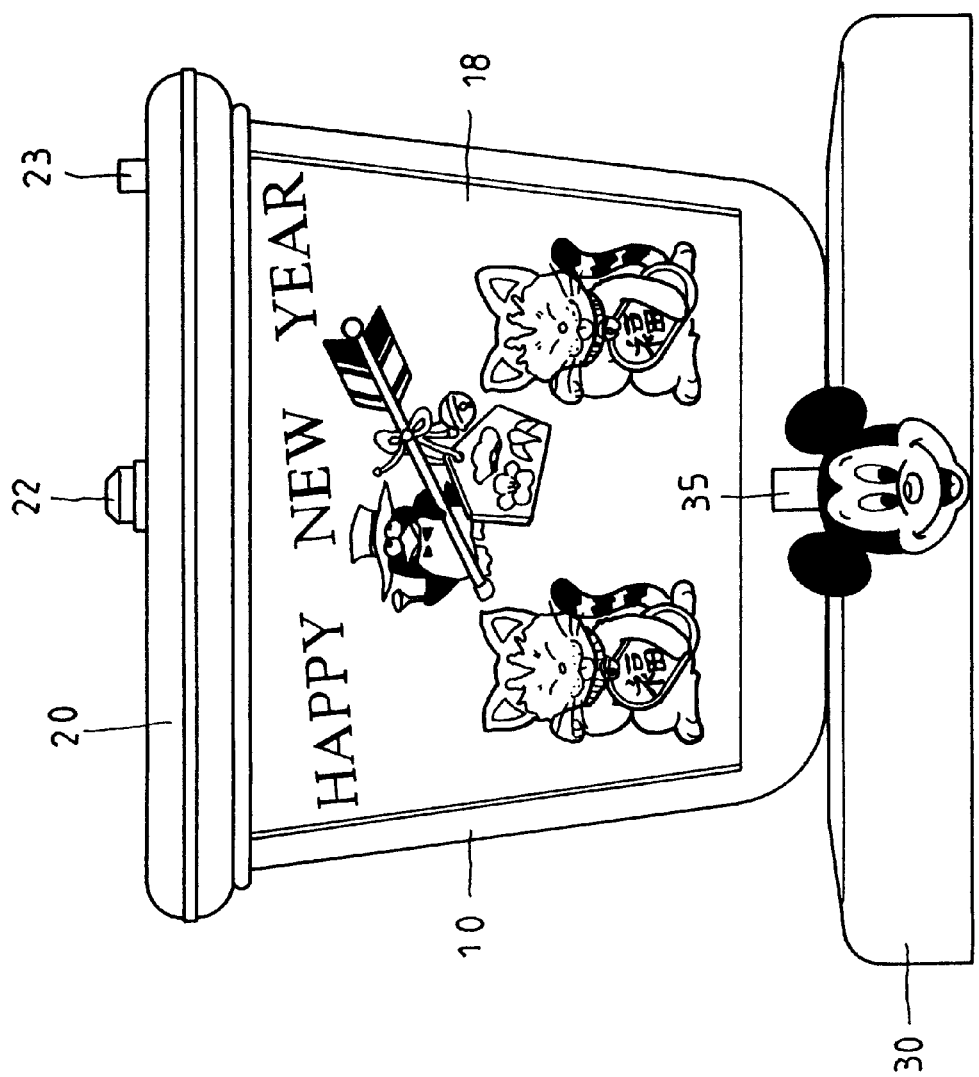
FIG. 4 is an elevational view of a flowerpot device of a preferred embodiment.

Referring to FIGS. 1 to 4, a flowerpot device 10 comprises a base seat 30, an outer pot 12 disposed on the base seat 30, an inner pot 11 disposed in the outer pot 12, an annular sponge 16 disposed in the inner pot 11, a collar 17 disposed on the annular sponge 16, an annular water container 20 disposed on the collar 17, and a hollow decoration casing 18 enclosing the outer pot 12.

The base seat 30 has an annular threaded center portion 31, a plurality of air-permeable web holes 32, a threaded hole 34, a plurality of drain apertures 37, and a first alarm device 33.

The outer pot 12 has an annular threaded bottom portion 19. The annular threaded bottom portion 19 engages with the annular threaded center portion 31.

The inner pot 11 has a plurality of reinforced ribs 14, and a plurality of drain holes 13 communicating with the drain apertures 37 of the base seat 30.

A plurality of air-permeable reverse cone-shaped holes 15 are formed on each of the reinforced ribs 14.

The annular sponge 16 has a plurality of periphery grooves 161. Each of the reinforced ribs 14 is inserted in the respective periphery groove 161.

The annular water container 20 has an annular interior 21, a water inlet hole 22 formed on a top portion of the annular water container 20 to communicate with the annular interior 21, a plurality of through apertures 24 formed on a bottom of the annular water container 20 to communicate with the annular interior 21, and a second alarm device 23.

A drain tube 35 engages with the threaded hole 34 of the base seat 30.

Referring to FIG. 3 again, a sand web 40 is disposed in a bottom of the inner pot 11 evenly. A grit layer 42 is disposed on the sand web 40. Soil is disposed between the grit layer 42 and the annular sponge 16. A potted plant 50 is planted in the flowerpot device 10. Water is poured into the annular interior 21 via the water inlet hole 22. Water flows from the through apertures 24 to the annular sponge 16.

When the annular interior 21 is empty, the second alarm device 23 will alarm. When the base seat 30 is full of water, the first alarm device 33 will alarm. The drain tube 35 can be rotated.

The invention is not limited to the above-identified embodiment. Any modification of the invention should be included in the scope of the invention.

I claim:

1. A flowerpot device comprises:

a base seat, an outer pot disposed on the base seat, an inner pot disposed in the outer pot, an annular sponge disposed in the inner pot, a collar disposed on the annular sponge, an annular water container disposed on the collar, a hollow decoration casing enclosing the outer pot, the base seat having an annular threaded center portion, a plurality of air-permeable web holes, a threaded hole, and a plurality of drain apertures, the outer pot having an annular threaded bottom portion, the annular threaded bottom portion engaging with the annular threaded center portion, the inner pot having a plurality of reinforced ribs, and a plurality of drain holes communicating with the drain apertures of the base seat, a plurality of air-permeable reverse cone-shaped holes formed on each of the reinforced ribs, the annular sponge having a plurality of periphery grooves, each of the reinforced ribs inserted in the respective periphery groove, the annular water container having an annular interior, a water inlet hole formed on a top portion of the annular water container to communicate with the annular interior, and a plurality of through apertures formed on a bottom of the annular water container to communicate with the annular interior, and a drain tube engaging with the threaded hole of the base seat.

* * * * *